P. B. NOYES.
DEVICE FOR STRETCHING PELTS OR SKINS.
APPLICATION FILED MAY 12, 1910.
1,010,789. Patented Dec. 5, 1911.
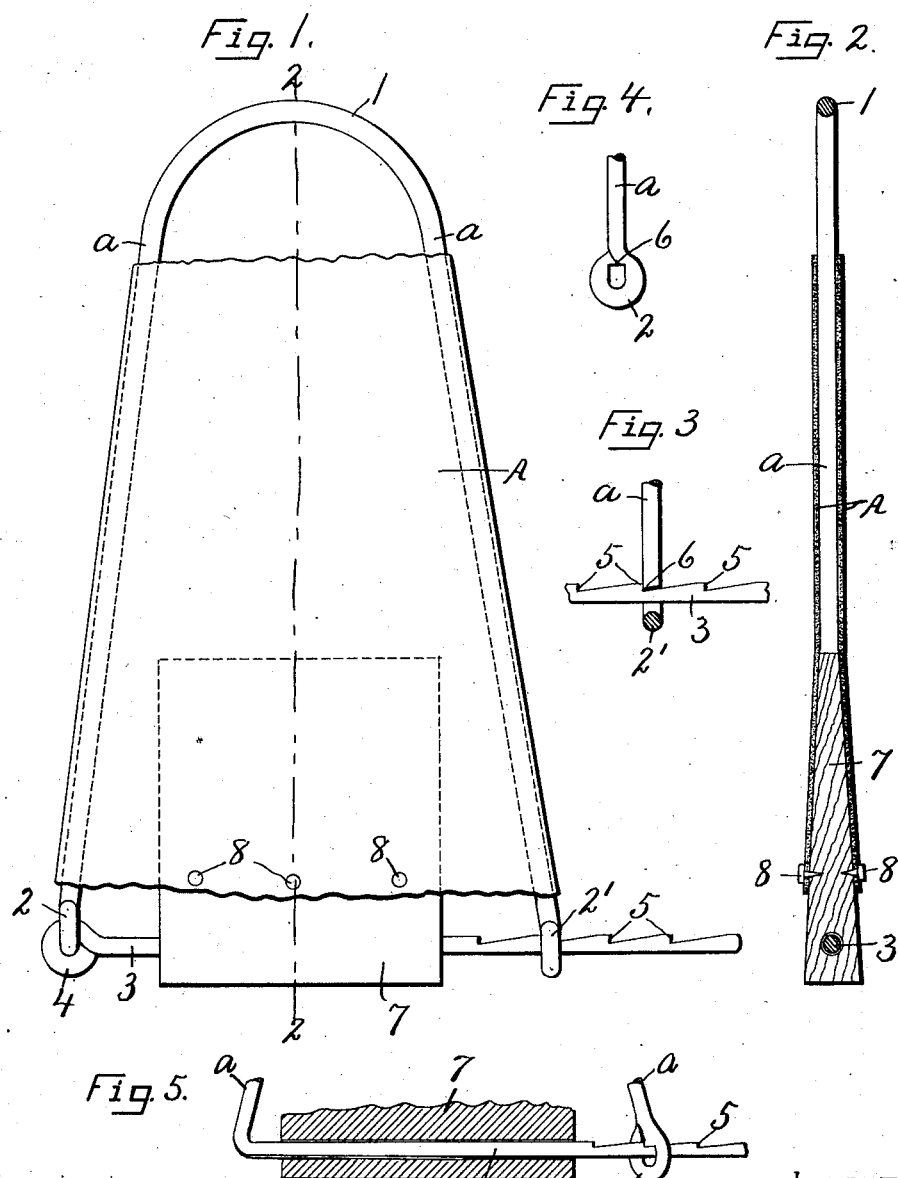

UNITED STATES PATENT OFFICE.

PIERREPONT B. NOYES, OF ONEIDA, NEW YORK, ASSIGNOR TO ONEIDA COMMUNITY LIMITED, OF ONEIDA, NEW YORK, A CORPORATION OF NEW YORK.

DEVICE FOR STRETCHING PELTS OR SKINS.

1,010,789.  Specification of Letters Patent.  Patented Dec. 5, 1911.

Application filed May 12, 1910. Serial No. 560,835.

*To all whom it may concern:*

Be it known that I, PIERREPONT B. NOYES, of Oneida, in the county of Madison, in the State of New York, have invented new and useful Improvements in Devices for Stretching Pelts or Skins, of which the following, taken in connection with the accompanying drawings, is a full, clear, and exact description.

This invention relates to certain improvements in devices for stretching pelts or skins as they are stripped from the animal, inside out, in tubular form preparatory to drying, curing or tanning. These pelts or skins are drawn tightly over an expansible or extensible frame which is adjusted or tensioned so as to stretch or tighten the pelt laterally and unless some provision is made for stretching the intermediate portions longitudinally, such intermediate portions shrink and therefore shorten considerably during the drying process, thereby reducing the size and value of the pelt or skin.

My object is to prevent this longitudinal shrinkage by providing at least one end of the frame with a comparatively broad flat body of wood or equivalent material adapted to receive tacks, nails or similar fastening devices by which the end or ends of the pelt may be secured to the block.

Another object is to provide an expansible frame in the form of a U-shape wire spring of suitable size to receive the entire pelt and having the ends of its arms operatively connected by a toothed bar along which the end of one of the arms is adjustable and adapted to be held in its adjusted position by the teeth of said bar.

Other objects and uses relating to specific parts of the device will be brought out in the following description.

In the drawings: Figure 1 is an elevation of a pelt stretching device embodying the various features of my invention, a pelt being shown in operative position thereon. Fig. 2 is a longitudinal sectional view taken on line 2—2, Fig. 1. Fig. 3 is a detail sectional view of one end of one of the arms of the frame showing a portion of the toothed detent or locking bar engaged therewith. Fig. 4 is a side elevation of the end of the spring arm shown in Fig. 3. Fig. 5 is a side elevation of the lower portion of a frame similar to that seen in Fig. 1, except that the U-shape bar and locking bar are formed of a single piece of wire.

In carrying out the objects stated, I provide a U-shape frame —1— of suitable size to receive an entire pelt, as —A—, and consisting of a single piece of spring wire having the free ends of its opposite arms, as —a—, terminating in eyes —2— and —2'— for receiving and supporting a transverse locking bar —3—. One end of the bar —3— is provided with an eye —4— which is pivotally interlocked with or swivel-connected to the eye —2—. The opposite end of the bar extends through and is guided in the eye or loop —2'— and is provided with a series of teeth —5— on one side thereof for interlocking engagement with a suitable shoulder —6— on the adjacent side of the eye —2'— for the purpose of holding the adjacent arm of the frame —1— in its adjusted position relatively to the opposite arm.

The normal form of the frame —1— is made to conform as nearly as possible to the original form and size of the flattened tubular pelt which is adapted to be dried thereon. The arms of the frame usually diverge from the curved portion which unites them at one end, so that when the pelt is thus mounted on the frame, the free ends of the arms —a— may be spread apart thus moving the eye —2'— and toothed bar —3— relatively to each other, thereby stretching the pelt to the desired degree laterally. When the pelt is thus stretched by and between the arms —a—, the shoulder —6— of the eye —2'— is engaged by the adjacent tooth —5— of the locking bar —3— to lock the arms —a— in their adjusted position. This lateral stretching of the pelt and also the drying of the same tends to shrink or draw the ends of the intermediate portion toward each other and in order to overcome this tendency a substantially flat or slightly wedge-shape block —7— of wood or equivalent material is pivotally mounted at one end upon the locking bar —3— between the free ends of the arms —a— or eyes —2— and —2'—. This block is comparatively broad laterally and when in operative position extends inwardly between and in substantially the same plane as the arms —a—, so that when the pelt is drawn over and upon said arms, it is also drawn over and upon the inwardly projecting portion of the block —7— in such manner that the opposite sides of the pelt lie flatwise against the corresponding sides of the block.

When the free ends of the arms —a— are adjusted to properly stretch the pelt laterally and locked in their adjusted positions, the adjacent ends of the intermediate portions of opposite sides of the pelt are drawn or stretched tightly lengthwise and fastened in this position by suitable fastening means, as tacks or nails —8—, thereby firmly holding this portion of the pelt in its longitudinally stretched position, by reason of the fact that the block —7— is anchored to the locking bar —3—.

One of the main features of the invention consists in providing the intermediate portion of the locking bar between the free ends of the arms —a— with a plate or block having fastening members by which the adjacent ends of the pelt may be held in their longitudinally stretched position, and, therefore, I do not limit myself to the use of a wood block and nails or tacks. Another feature of the invention lies in making the frame of a single piece of spring wire bent U-shape and having its free ends adjustable relatively to each other and provided with means for holding them in their adjusted position. It is evident, however, that this frame may be constructed of any suitable spring material. A still further feature of advantage in the use of the plate —7— is that it may be reversed on the locking bar —3— to receive any appendages or extensions of the pelt, such for example as the tail, which might be used to stretch the intermediate portion of at least one side of the pelt longitudinally and then tacked or otherwise secured to the plate.

In Fig. 5 I have shown a locking bar —3'— as integrally united at one end to one of the arms, as —a—, of the U-shape frame and having its other end passed through an eye —2'— and provided with teeth —5— corresponding to the parts —2'— and —5— shown in Fig. 1. This modification may be the preferred form, because the locking bar and U-shape frame are made of a single piece of spring wire, so that the locking bar forms practically a continuation of the locking arms —a— bent at an angle therewith, so as to ride freely through the eye —2—, but spring tensioned so as to engage its teeth —5— with the shoulder —6— in the manner previously described, it being understood that the plate —7— is mounted upon the intermediate portion of the bar —3'— in the same manner as shown in Fig. 1. Aside from the fact that the bar —3'— forms a continuation of one of the arms —a—, the construction and operation is substantially the same as the device shown in Figs. 1, 2, 3 and 4.

What I claim is:

1. A pelt stretching device comprising an inverted U-shaped frame formed from a strip of resilient material having one of the arms thereof provided at its free end with an eye, a shoulder formed interiorly of the eye, a locking bar connected at one end to the opposite arm of the frame and having its free end received through said eye, teeth formed along said locking bar at its free end to engage said shoulder, and a relatively wide wedge-shaped block pivotally mounted at its thick end on said bar between the arms of the frame for use in attaching a hide stretched on the frame either when the block lies between the arms or is swung around on the bar to project beyond the free ends of the arms, the thin end of said block being unattached to the frame.

2. In a pelt stretching device, an inverted U-shaped frame having one of the arms thereof provided at its free end with an eye, a shoulder formed interiorly of the eye, a locking bar connected at one end to the free end of the other arm of said frame and having its free end received through the eye on the first-mentioned arm, teeth formed along said bar to engage the shoulder in said eye, and a relatively wide wedge-shaped block through which the locking bar extends adjacent the thick end of the block, said block being free to swing on the bar so as to lie between the arms or extend beyond the free ends of the latter.

In witness whereof I have hereunto set my hand on this 30th day April 1910.

PIERREPONT B. NOYES.

Witnesses:
  S. WAYLAND SMITH,
  J. M. MILNES.

---

Copies of this patent may be obtained for five cents each, by addressing the "Commissioner of Patents, Washington, D. C."